Figure 1:
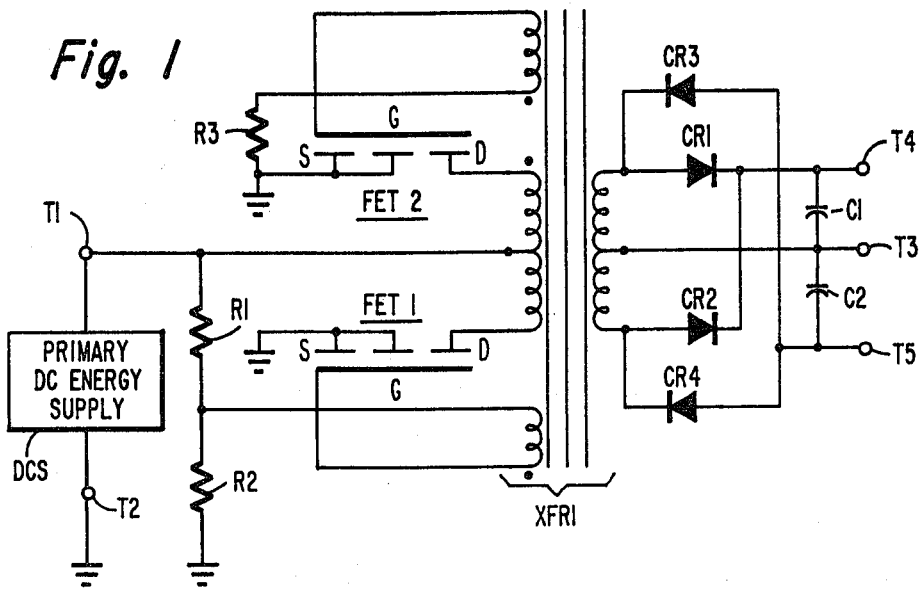

United States Patent [19]

Clark, Jr.

[11] 4,390,937
[45] Jun. 28, 1983

[54] SELF-STARTING TRANSFORMER-COUPLED FET MULTIVIBRATORS

[75] Inventor: Charles A. Clark, Jr., Chatsworth, Calif.

[73] Assignee: RCA Corporation, New York, N.Y.

[21] Appl. No.: 274,624

[22] Filed: Jun. 17, 1981

[51] Int. Cl.³ .......................................... H02M 3/335
[52] U.S. Cl. ................................ 363/22; 331/113 A; 363/49; 363/133
[58] Field of Search ............ 331/113 A, 148; 363/22, 363/23, 49, 133, 29

[56] References Cited

FOREIGN PATENT DOCUMENTS 46-5853 2/1971 Japan .................................... 363/133

OTHER PUBLICATIONS

Power Conversion International, vol. 6, No. 2, pp. 75–76, 79–82, Mar.–Apr. 1980.
VMOS Power FETs Design Catalog, Mar. 1979, (Siliconix), pp. 4–6, Figure Labeled "DC to DC Converter" in AN 76-3.

Primary Examiner—William H. Beha, Jr.
Attorney, Agent, or Firm—Joseph S. Tripoli; Robert L. Troike; Allen L. Limberg

[57] ABSTRACT

A self-starting transformer-coupled FET multivibrator is constructed to avoid net dc flow in the primary winding of its transformer, driven push-pull by the multivibrator FET's.

12 Claims, 3 Drawing Figures

SELF-STARTING TRANSFORMER-COUPLED FET MULTIVIBRATORS

The invention relates to self-starting transformer-coupled field-effect transistor (FET) multivibrators.

Transformer-coupled multivibrators are used in inverters for converting dc voltage (e.g. from batteries) to ac voltage, which may be stepped up or down using the same transformer used for cross-coupling the multivibrator transistors, and in dc-to-dc converters wherein the ac voltage obtained by inverter action is subsequently rectified. Recently power FET's have been developed which are suited for such usage. The manufacturers have recommended traditional imbalance starting for FET's in these transformer-coupled multivibrator applications. (E.g. see Siliconix Power FET Design Catalog, 1977, Application Note AN 76-3 pp. 586.) The problems with this is that there is a consequent net dc flow in the transformer, as well as imbalance in the gate drives to the multivibrator FET's. The net dc flow causes saturation of the core to occur more quickly during the portion of each oscillating cycle when one of the multivibrator FET's is conductive than during the portion of that cycle when the other of the multivibrator FET's is conductive. This leads to an undesirable loss in conversion efficiency in push-pull inverter or converter applications.

The invention is embodied in a transformer-coupled FET multivibrator wherein to achieve self-starting one multivibrator FET receives quiescent biasing tending to favor its conduction instead of the other multivibrator FET, and wherein the transformer-coupled positive feedback is unbalanced such that substantially equal duty cycles for the multivibrator FET's can be obtained in spite of the self-starting method employed.

Figure 2:
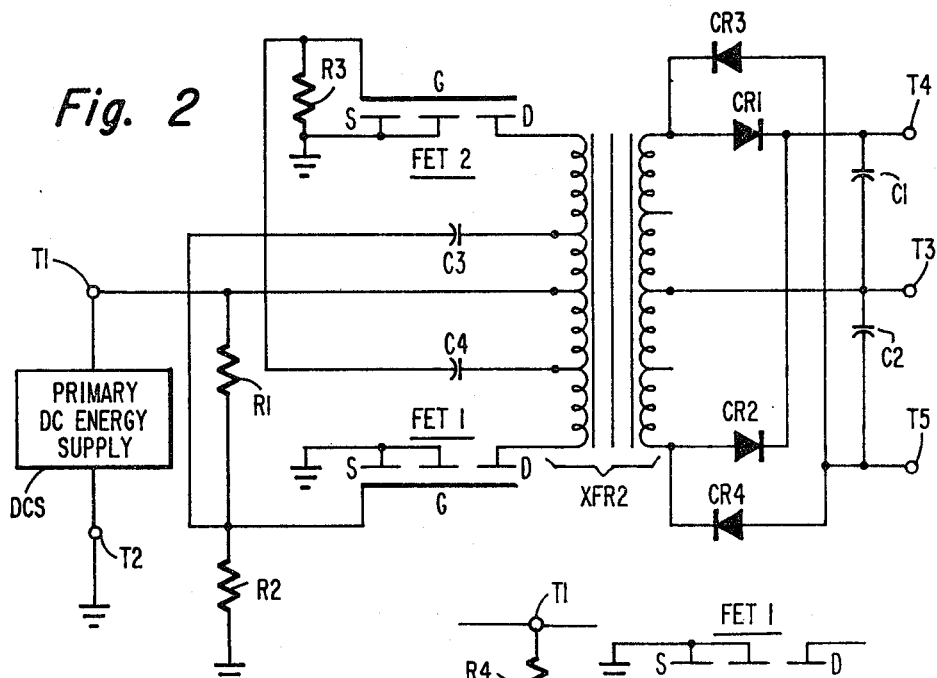
Figure 3:
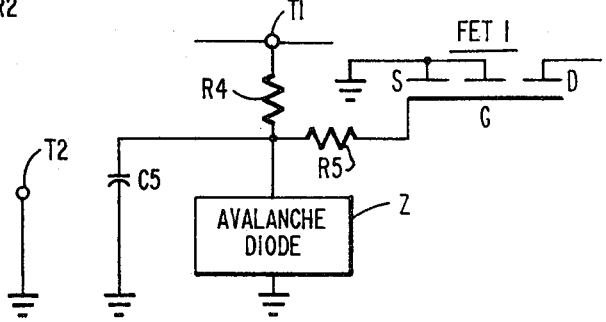

In the drawing:

FIGS. 1 and 2 are schematic diagrams of switching dc-to-dc converters, each including a self-starting transformer-coupled FET multivibrator embodying the invention, and FIG. 3 is a schematic diagram of a modification that can be made in the circuits of FIGS. 1 and 2, the modified circuits thus provided also embodying the invention.

In FIGS. 1 and 2 a primary dc energy supply DCS applies a potential between input terminals T1 and T2 which is divided by a potential divider connection of resistors R1 and R2, to develop a forward-bias potential between the source and gate electrodes of an enhancement-mode field effect transistor FET1, predisposing it for conduction. FET1 and another enhancement-mode field effect transistor FET2 have their source-to-drain paths arranged to provide push-pull drive to the primary winding of an inverter transformer, XFR1 in FIG. 1 and XFR2 in FIG. 2. This is shown in each of FIGS. 1 and 2 as comprising connection of the source electrodes of FET1 and FET2 to terminal T2 through ground bus and connection of the drain electrodes of FET1 and FET2 to respective end taps of the primary winding, and connection of a center-tap of the primary to terminal T1. (The source, drain and gate electrodes of the FET's are labelled "S", "D" and "G", respectively, in the Figures. Either conductivity type of FET's may be used, depending on the polarity of the direct potential primary supply DCS impresses between terminals T1 and T2.) FET2 has a direct current conductive path between gate and source electrodes tending to keep the direct components of their respective potentials the same, which path includes a resistor R3. The resistance of R3 is about the same as the paralleled resistances of R1 and R2 to match speeds of transition from conduction through FET1 to conduction through FET2 and from conduction through FET2 to conductive through FET1. R3 resistance in practice is somewhat lower in value because the gate swing on FET2 is made larger than that on FET1 in accordance with the invention.

Transformers XFR1 and XFR2 in FIGS. 1 and 2, respectively, are shown with secondary windings driving full wave-bridge rectifier connections of current rectifiers CR1, CR2, CR3 and CR4. These full-wave-bridge connections develop positive direct output potential across capacitor C1 between terminals T3 and T4, and they develop negative direct output potential across capacitor C2 between terminals T4 and T5. Other arrangements for rectifying inverter output to obtain dc-to-dc conversion may be used, per prior art practice, but it is preferable to use an arrangement with no net dc flow through the secondary winding of the inverter transformer.

FET1 and FET2 have cross-coupled drain-to-gate feedback connections through the inverter transformer which cause astable multivibrator action between these two FET's after oscillations are established in the regenerative loop completed by these feedback connections. The necessary inversion in the cross-couplings is achieved in FIG. 1 by transformer XFR1 including a pair of tertiary windings, the one having fewer turns than the other being in the gate circuit of FET1, and the one having more turns than the other being in the gate circuit of FET2.

In FIG. 2 transformer XFR2 does not have separate tertiary windings; instead, its primary winding is tapped to provide feedback signals by auto-transformer action and is resistively coupled to the gates of FET1 and FET2. The parallel connections of resistors R1 and R2 are the coupling resistor to the gate circuit of FET1 from the half of primary winding driven by FET2, with capacitor C3 accommodating the difference in direct potentials at FET2 drain and FET1 gate. R3 is the coupling resistor to the gate circuit of FET2 from the half of the primary winding driven by FET1, with capacitor C4 accommodating the difference in direct potentials at FET1 drain and FET2 gate. The number of turns between center tap of XFR2 primary winding and the tap resistively coupled to FET1 gate is smaller than the number of turns between the center tap and the tap resistively coupled to FET2 gate.

Particular note should be taken of the larger ac potential swings fed back to FET2 gate than are fed back to FET1 gate. This feature, which characterizes the invention, is obtained in FIGS. 1 and 2 by making the number k of turns in the winding or winding portion coupled to the gate circuit of FET1 smaller than the number, k', of turns in the winding or winding portion coupled to the gate circuit of FET2. This avoids the problem previously associated with imbalance starting that half cycles of converter operation do not match, undesirably causing dc flow in the transformer primary winding.

Gate threshold voltages for power FET's run from one to four volts. The input voltage applied between terminals T1 and T2 is divided down to five volts by resistors R1 and R2 for application between source and gate electrodes of FET1, so its initial conduction is assured. The ac potential swing across the winding or portion of winding coupled to the gate circuit of FET1 has six volt peak values. This gives eleven volts of "on" drive to FET1 as measured between its source and gate and one volt of oppositely poled "off" driving during its cut off. The ac potential swing across the winding or portion of winding coupled to gate circuit of FET2 has eleven volt value. So there is eleven volts of "on" drive to FET2 matching the eleven volts of "on" drive to FET1. There is eleven volts of oppositely poled "off" drive to FET2 as opposed to the one volt of oppositely poled "off" drive to FET1. But since there is virtually no difference in operation of the FET's, owing to difference in the cut-off potentials, the inverter operates symmetrically and there is no dc flow in the primary winding of the inverter transformer XFR1 or XFR2.

FIG. 3 shows a modification that can be made to the FIG. 1 or 2 circuit to enable it to accomodate a wider range of input voltages between terminals T2 and T1. Resistors R1 and R2 in potential divider configuration are replaced. An avalanche diode Z is reverse biased into avalanche by current flowing through resistor R4, R4 and Z being in series connection for dc between terminals T1 and T2. A capacitor C5 bypasses diode Z for ac signal swing, so the five volt direct potential for forward biasing the gate circuit of FET1 is made available across diode Z. It is applied to the gate circuit through a resistor R5 having the same resistance the parallel combination of now-replaced resistors R1 and R2 had. Since the resistances of R3 and R5 are similar, they may be replaced by respective direct connections without substantial intervening impedances.

The multivibrator oscillation frequency can be controlled after starting by alternately clamping the gates of FET1 and FET2 to their source electrodes. Or the multivibrator may be left free-running, as shown in FIGS. 1 and 2.

What is claimed is:

1. A self-starting transformer-coupled multivibrator comprising:
   first and second terminals for receiving first and second direct potentials respectively;
   a third terminal for receiving a third direct potential between said first and second direct potentials;
   a transformer having a core of magnetically saturable material, having a primary winding with first and second end connections and a center-tap connection to said first terminal;
   first and second field effect transistors having respective source electrodes connected to said second terminal, having respective drain electrodes respectively connected to the first end connection of said primary winding and to its second end connection, and having respective gate electrodes;
   means for applying a gate potential having a quiescent component and a dynamic component to said first field effect transistor, including
   means for applying said third direct potential to the gate electrode of said first field effect transistor as the quiescent component of its potential, and including
   means for applying to the gate electrode of said first field effect transistor as the dynamic component of its potential a potential proportionally responsive by a factor $-k$ to the potential between the center tap and second end connection of said primary winding, k being a positive number;
   means for applying a gate potential having a quiescent component and a dynamic component to the gate electrode of said second field effect transistor, including
   means for applying said second direct potential to the gate electrode of said second field effect transistor as the quiescent component of its potential, and including
   means for applying to the gate electrode of said second field effect transistor as the dynamic component of its potential a potential proportionally responsive by a factor $-k'$ to the potential between the center tap and first end connection of said primary winding, $k'$ being a positive number larger than k.

2. A self-starting transformer-coupled multivibrator as set forth in claim 1 in a dc-to-ac inverter wherein said transformer has a secondary winding across which an ac voltage is supplied responsive to the difference between said first and second direct potentials.

3. An inverter as set forth in claim 2 included in a dc-to-dc converter together with:
   means for rectifying current flow through the secondary winding of said transformer.

4. A combination as set forth in claim 3 further including means for supplying said third direct potential, which means includes:
   a first resistor connected between said first and third terminals; and
   a second resistor connected between said second and third terminals.

5. A combination as set forth in claim 3 further including means for supplying said third direct potential, which means includes:
   a diode connected between said second and third terminals; and
   means connected between said first and third terminals for applying current to said diode, responsive to which said third direct potential is developed across said diode.

6. A combination as set forth in claim 2 further including means for supplying said third direct potential, which means includes:
   a first resistor connected between said first and third terminals; and
   a second resistor connected between said second and third terminals.

7. A combination as set forth in claim 2 further including means for supplying said third direct potential, which means includes:
   a diode connected between said second and third terminals; and
   means connected between said first and third terminals for applying current to said diode, responsive to which said third direct potential is developed across said diode.

8. A combination as set forth in claim 1 further including means for supplying said third direct potential, which means includes:
   a first resistor connected between said first and third terminals; and
   a second resistor connected between said second and third terminals.

9. A combination as set forth in claim 1 further including means for supplying said third direct potential, which means includes:
   a diode connected between said second and third terminals; and
   means connected between said first and third terminals for applying current to said diode, responsive to which said third direct potential is developed across said diode.

10. In a transformer-coupled multivibrator in which a first and a second field effect transistor have alternately conducting channels connected to provide push-pull drive to the primary winding of a transformer, which transformer has a core of magnetically saturable material, the improvement providing for self-starting of the multivibrator which comprises:

means for applying between the source and gate electrodes of said first field effect transistor a first source-to-gate potential having a quiescent component and a dynamic component, including means applying as the dynamic component of said first source-to-gate potential a potential proportionally responsive by a first factor to the potential across said primary winding for completing a first regenerative feedback connection, and including means applying as the quiescent component of said first source-to-gate potential a direct potential conditioning the channel of said first field effect transistor to be conductive at start-up; and means for applying between the source and gate electrodes of said second field effect transistor a second source-to-gate potential having a quiescent component and a dynamic component, including means applying as the dynamic component of said second source-to-gate potential a potential proportionally responsive by a second factor to the potential across said primary winding, which second factor is larger than said first factor, and including means applying as the quiescent component of said second source-to-gate potential a direct potential conditioning the channel of said second field effect transistor to be relatively non-conductive at start-up.

11. A self-starting transformer-coupled multivibrator as set forth in claim 10 in a dc-to-ac inverter wherein said transformer has a secondary winding across which an ac voltage is supplied responsive to the difference between said first and second direct potentials.

12. An inverter as set forth in claim 11 included in a dc-to-dc converter together with:

means for rectifying current flow through the secondary winding of said transformer.

* * * * *